(12) United States Patent
Takeuchi

(10) Patent No.: US 8,579,361 B2
(45) Date of Patent: Nov. 12, 2013

(54) VEHICLE UNDERCOVER

(75) Inventor: Eishi Takeuchi, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 2 days.

(21) Appl. No.: 13/061,789

(22) PCT Filed: Oct. 31, 2008

(86) PCT No.: PCT/JP2008/069939
§ 371 (c)(1),
(2), (4) Date: Mar. 2, 2011

(87) PCT Pub. No.: WO2010/050060
PCT Pub. Date: May 6, 2010

(65) Prior Publication Data
US 2011/0163570 A1     Jul. 7, 2011

(51) Int. Cl.
*B62D 35/02*     (2006.01)

(52) U.S. Cl.
USPC ............................. 296/185.1; 296/38

(58) Field of Classification Search
USPC .......... 296/181.5, 184.1, 180.1, 180.4, 180.5, 296/38; 180/69.1
See application file for complete search history.

(56) References Cited

U.S. PATENT DOCUMENTS

| | | | | |
|---|---|---|---|---|
| 2,931,453 A | * | 4/1960 | Ingless | 180/69.1 |
| 3,608,928 A | * | 9/1971 | Hooker | 280/768 |
| 6,202,778 B1 | * | 3/2001 | Mistry et al. | 180/69.1 |
| 6,257,655 B1 | * | 7/2001 | Selby et al. | 296/186.2 |
| 6,644,720 B2 | * | 11/2003 | Long et al. | 296/180.4 |
| 6,712,424 B2 | * | 3/2004 | Swain | 296/180.1 |
| 6,846,035 B2 | * | 1/2005 | Wong et al. | 296/180.1 |
| 6,945,594 B1 | * | 9/2005 | Bejin et al. | 296/193.07 |
| 7,780,224 B2 | * | 8/2010 | Roush | 296/180.4 |
| 2008/0185866 A1 | * | 8/2008 | Tarrant et al. | 296/97.22 |
| 2010/0060038 A1 | * | 3/2010 | Takakura et al. | 296/193.07 |

FOREIGN PATENT DOCUMENTS

| | | |
|---|---|---|
| CN | 201021242 Y | 2/2008 |
| DE | 201 20 819 U1 | 5/2002 |
| DE | 10 2007 002 209 A1 | 7/2008 |
| JP | 54-36251 U | 8/1977 |
| JP | 59-8867 U | 1/1984 |
| JP | 59-76483 U | 5/1984 |

(Continued)

OTHER PUBLICATIONS

German Patent Office Office Action (11 2008 004 003.6-56) dated Dec. 12, 2012.

(Continued)

*Primary Examiner* — Glenn Dayoan
*Assistant Examiner* — Pinel Romain
(74) *Attorney, Agent, or Firm* — Oblon, Spivak, McClelland, Maier & Neustadt, L.L.P.

(57) ABSTRACT

A vehicle undercover is provided with a fixed section fixed to a front body and a rotating section, one end of which is rotatably coupled to the fixed section and the other end of which vertically moves relative to the front body so as to be able to open and close a lower opening, in which the fixed section closes a part of the lower opening and the rotating section closes a remaining part of the lower opening, which is not closed by the fixed section. Such a configuration improves aerodynamic performance of a vehicle and improves workability of maintenance operation.

5 Claims, 2 Drawing Sheets

(56) References Cited

FOREIGN PATENT DOCUMENTS

| JP | 1-76372 U | 5/1989 |
|---|---|---|
| JP | 1-123979 U | 8/1989 |
| JP | 3-93289 U | 9/1991 |
| JP | 4-84088 U | 7/1992 |
| JP | 2003-72394 | 3/2003 |

OTHER PUBLICATIONS

International Search Report issued Dec. 16, 2008, in PCT/JP2008/069939 with English translation.

* cited by examiner

VEHICLE UNDERCOVER

TECHNICAL FIELD

The present invention relates to a vehicle undercover provided on a lower part of a front body of a vehicle.

BACKGROUND ART

An undercover is provided on a lower part of a front body of a vehicle, that is to say, below an engine room. Therefore, air, which flows under the vehicle, flows along the undercover when the vehicle travels, thereby improving aerodynamic performance.

However, it is required to perform maintenance on various devices such as an engine arranged in the engine room of the vehicle from below. For example, in replacement of engine oil and replacement of an oil filter, an operator performs various pieces of operation on the engine in a state in which the vehicle is lifted up.

Therefore, a plurality of working openings are provided on a conventional undercover on positions corresponding to various pieces of maintenance operation, and such openings are closed by a cover when not being used. Each patent document discloses such a vehicle undercover. The undercover of the vehicle disclosed in patent document 1 is such that the opening is provided on a part thereof and a cap to close the opening so as to be freely opened is integrally formed by providing a thin portion for a hinge on one side of the opening. A sound isolation undercover of a vehicle of patent document 2 is such that an access hole is provided and a lid to block the access hole is attached by a screw and a nut. A front end structure of a vehicle of patent document 3 is such that a discharge opening is provided behind a radiator on an undercover and a guide flap is provided.

Patent Document 1: Japanese Utility Model Application Laid-open No. H04-084088
Patent Document 2: Japanese Utility Model Application Laid-open No. S54-036251
Patent Document 3: Japanese Patent Application Laid-open No. 2003-072394

DISCLOSURE OF INVENTION

Problem to be Solved by the Invention

In the above-described conventional vehicle undercover, the opening is provided on a part of a cover main body and the lid is provided for the opening so as to be freely opened and closed. Therefore, it is conventionally required to provide a plurality of openings according to the various pieces of maintenance operation for one undercover. In this case, the undercover is formed of a resin and the lid is integrally formed by an integral hinge. However, since the undercover and the lid are formed of the resin, rigidity is not sufficient and a slit-like gap is formed between the lid and the opening when the lid closes the opening. Then, relative wind enters the gap and air resistance increases, so that the aerodynamic performance is deteriorated. In this case, when a plate thickness is increased so as to improve the rigidity of the undercover and the lid, not only a manufacturing cost increases but also a vehicle weight increases. Also, when the lid is fixed to the cover main body by a screw without the gap therebetween, operation to remove the lid in order to open the opening at the time of the maintenance operation becomes complicated and maintenance performance is deteriorated.

The present invention is for solving such a problem, and an object thereof is to provide the vehicle undercover, which improves the aerodynamic performance of the vehicle and improves workability of the maintenance operation.

Means for Solving Problem

In order to solve the above mentioned problem and achieve the object, a vehicle undercover according to the present invention provided on a lower opening of a front body of a vehicle, includes a fixed section fixed to the front body; and a rotating section, one end of which is rotatably coupled to the fixed section and the other end of which vertically moves relative to the front body so as to be able to open and close the lower opening.

In the vehicle undercover according to the present invention, the fixed section closes a part of the lower opening, and the rotating section closes a remaining part of the lower opening, which is not closed by the fixed section.

In the vehicle undercover according to the present invention, the vehicle undercover is formed of a synthetic resin and the fixed section and the rotating section are rotatably coupled to each other by an integral hinge along a vehicle width direction.

In the vehicle undercover according to the present invention, the fixed section is fixed to the front body by a bolt and the rotating section is detachably attached to the front body by a clip.

In the vehicle undercover according to the present invention, the fixed section is fixed to the front body by a plurality of bolts and the plurality of bolts are provided side by side along a direction of a rotation axis center of the rotating section.

In the vehicle undercover according to the present invention, the fixed section is fixed to the front body in an inclined state in which a side of a front portion of a vehicle is inclined upward and the rotating section closes the lower opening in a horizontal state.

In the vehicle undercover according to the present invention, the rotating section has a reinforcing rib along a vehicle longitudinal direction or along the vehicle width direction.

Effect of the Invention

The vehicle undercover of the present invention is provided with a fixed section fixed to a front body and a rotating section rotatably coupled to the fixed section to vertically move relative to the front body, thereby opening and closing the lower opening. Therefore, the aerodynamic performance of the vehicle can be improved and the workability of the maintenance operation can be improved.

EXPLANATIONS OF LETTERS OR NUMERALS

Figure 1:
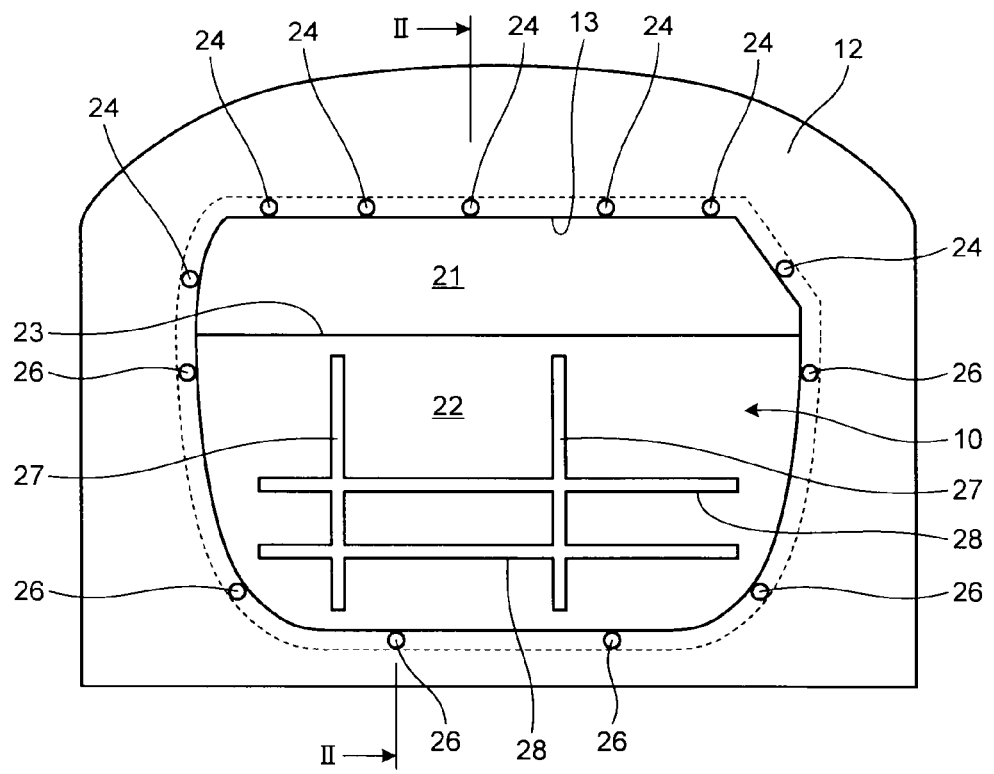
FIG. 1 is a plane view of a vehicle undercover according to one embodiment of the present invention.

10 Vehicle undercover
11 Vehicle

12 Front body
13 Lower opening
21 Fixed section
22 Rotating section
23 Integral hinge
24 Bolt
25 Nut
26 Clip
27, 28 Reinforcing rib

BEST MODE(S) FOR CARRYING OUT THE INVENTION

An embodiment of a vehicle undercover according to the present invention is hereinafter described in detail with reference to the drawings. Meanwhile, the present invention is not limited by the embodiment.

Embodiment

Figure 2:
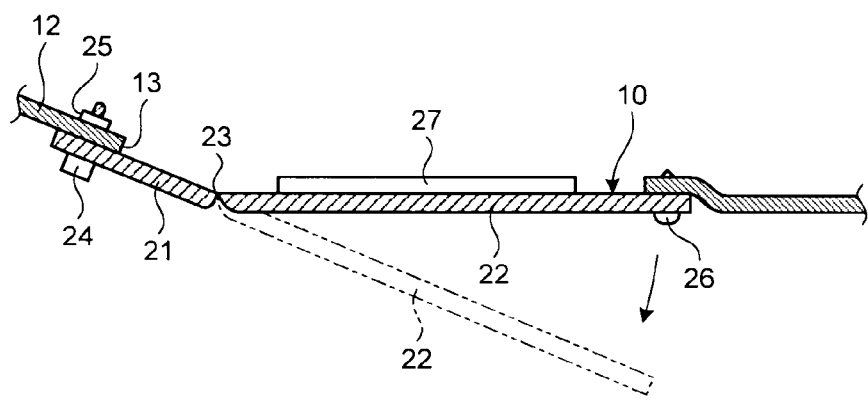
FIG. 2 is a cross-sectional view taken along line II-II in FIG. 1 illustrating a cross section of the vehicle undercover of this embodiment.
Figure 3:
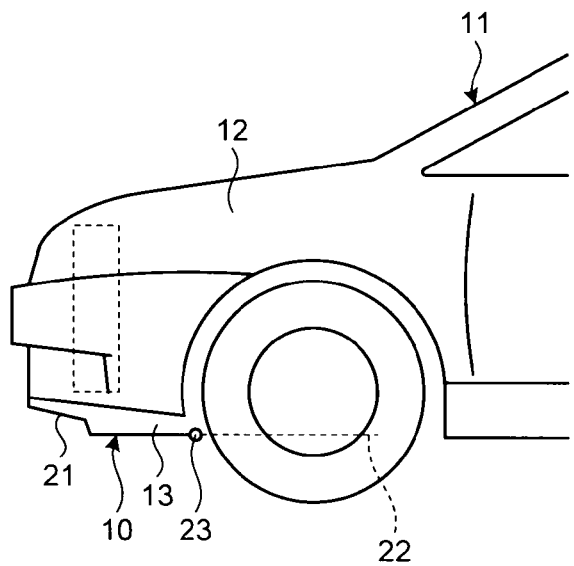
FIG. 3 is a side view of a front portion of a vehicle on which the vehicle undercover of this embodiment is mounted.
Figure 4:
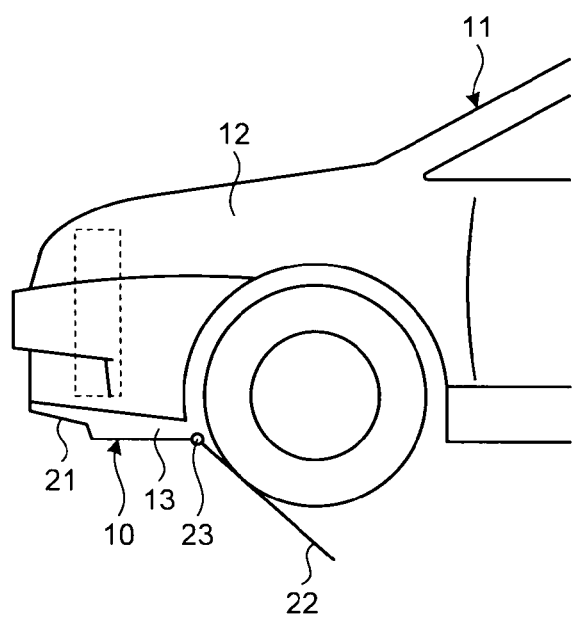
FIG. 4 is a side view of the front portion of the vehicle illustrating a state in which a working opening is opened.

FIG. 1 is a plane view of the vehicle undercover according to one embodiment of the present invention, FIG. 2 is a cross-sectional view taken along line II-II in FIG. 1 illustrating a cross section of the vehicle undercover of this embodiment, FIG. 3 is a side view of a front portion of a vehicle on which the vehicle undercover of this embodiment is mounted and FIG. 4 is a side view of the front portion of the vehicle in a state in which a working opening is opened.

In this embodiment, as illustrated in FIG. 3, a lower opening 13 is formed on a lower part of a front body 12 of a vehicle 11, and a vehicle undercover 10 of this embodiment is mounted so as to block the lower opening 13. The vehicle undercover 10 is provided with a fixed section 21 fixed to the front body 12 and a rotating section 22, one end of which is rotatably coupled to the fixed section 21 and the other end of which vertically moves relative to the front body 12 so as to be able to open and close the lower opening 13.

That is to say, as illustrated in FIGS. 1 and 2, the lower opening 13 is formed on the front body 12 of the vehicle 11 so as to correspond to an almost entire area of an engine room. The vehicle undercover 10 mounted so as to block the lower opening 13 from below the vehicle 11 has an area slightly larger than that of the lower opening 13 and is arranged such that an outer periphery thereof is overlapped with an edge of the lower opening 13 (front body 12).

In the vehicle undercover 10, the rotating section 22 is coupled to the fixed section 21 by an integral hinge 23. That is to say, the vehicle undercover 10 is obtained by integrally forming the fixed section 21, the rotating section 22 and the integral hinge 23 of a synthetic resin. The integral hinge 23 is composed of a concave portion along a direction of a rotation axis between the fixed section 21 and the rotating section 22. The fixed section 21 closes a part of the lower opening 13 and the rotating section 22 closes a remaining part of the lower opening 13, which is not closed by the fixed section 21.

The fixed section 21 is arranged on a side of a front end (upper end in FIG. 1) of the lower opening 13 of the front body 12. A front edge and a side edge of the fixed section 21 are overlapped with the outer edge of the lower opening 13 of the front body 12 from below and a plurality of bolts 24 pass through the both of them from below, each nut 25 is screwed to each bolt 24 from above, thereby fastening the fixed section 21 to the front body 12.

The rotating section 22 is arranged on a side of a rear end (lower end in FIG. 1) of the lower opening 13 of the front body 12. A rear edge and a side edge of the rotating section 22 are overlapped with the outer edge of the lower opening 13 of the front body 12 from below and a plurality of clips 26 pass through the both of them from below to engage them with each other, thereby detachably attaching the rotating section 22 to the front body 12. In this case, the rotating section 22 is such that a front end (one end) thereof is rotatably coupled to a rear end of the fixed section 21 by the integral hinge 23. On the other hand, a rear end (the other end) thereof vertically moves relative to the front body 12 so as to be able to open and close the lower opening 13.

The rotating section 22 is set to have an area larger than that of the fixed section 21 so as to be able to open the lower opening 13 half way or more. A center of the rotation axis of the integral hinge 23, which couples the fixed section 21 and the rotating section 22 so as to be rotatable, is provided along a width direction of the vehicle 11. Also, in the fixed section 21 fixed to the front body 12 by the bolts 24 and the nuts 25, a part of the bolts 24 and the nuts 25, that is to say, five pairs of bolts 24 and nuts 25 are provided side by side along the direction of the rotation axis center of the integral hinge 23. In this case, the bolts 24 and the nuts 25 may be arranged at substantially equal intervals.

Also, the fixed section 21 is fixed to the front body 12 in an inclined state in which a vehicle front side thereof is inclined upward, and the rotating section 22 is mounted so as to close the lower opening 13 in a horizontal state. More specifically, in a state in which the rotating section 22 closes the lower opening 13, that is to say, in a travel state of the vehicle 11, the fixed section 21 is arranged so as to be inclined downward from the front body 12 from the front portion of the vehicle rearward, and the rotating section 22, which is substantially parallel to a road surface, is arranged in succession to the fixed section 21.

Further, a plurality of first reinforcing ribs 27 in a vehicle longitudinal direction are provided on an upper surface of the rotating section 22 side by side in the width direction of the vehicle 11. Also, a plurality of second reinforcing ribs 28 in the vehicle width direction are provided on the upper surface of the rotating section 22 side by side in the longitudinal direction of the vehicle 11. Each of the first reinforcing ribs 27 and each of the second reinforcing ribs 28 intersect with each other.

In the above-described vehicle undercover 10 of this embodiment, in general, that is to say, when maintenance operation is not performed, the rotating section 22 is attached to the front body 12 by the clips 26 to be positioned horizontally. Therefore, since a lower surface of the front body 12 is maintained in a flat state by the rotating section 22, a gap is not formed between the front body 12 and the vehicle undercover 10, so that relative wind is prevented from entering at the time of travel of the vehicle 11 and air resistance does not increase.

On the other hand, when performing the maintenance operation, if the clips 26 are removed in a state in which the vehicle 11 is lifted up, the rotating section 22 becomes free and rotates downward to widely open the lower opening 13. Therefore, an operator can perform various pieces of maintenance operation from the widely opened lower opening. In general, a position of an engine and a position for performing the maintenance differ according to a vehicle type, so that a common undercover 10 can be used by different vehicle types by providing the rotating section 22 widely opened in the vehicle width direction, and a manufacturing cost can be decreased. In this case, the engine and an oil pan are located above the rotating section 22 so as to be opposed thereto, so that the engine and the oil pan can be visually recognized from the lower opening 13 opened by the rotating section 22 and oil and an oil filter can be easily replaced using the lower opening 13.

In this manner, the vehicle undercover 10 of this embodiment is provided with the fixed section 21 fixed to the front body 12 and the rotating section 22, one end of which is rotatably coupled to the fixed section 21 and the other end of which vertically moves relative to the front body 12 so as to be able to open and close the lower opening 13.

Therefore, since a part of the vehicle undercover 10 for covering the lower opening 13 rotates to open the lower opening 13, the gap is not generated in the undercover 10 itself and the rotating section 22 and the front body 12 are attached by the clips 26 in the state overlapped with each other, so that the relative wind at the time of the travel of the vehicle 11 is prevented from entering, the air resistance does not increase and aerodynamic performance of the vehicle can be improved, and as a result, a fuel consumption can be improved. Also, when performing the maintenance operation, by removing the clips 26 and rotating the rotating section 22 downward, the lower opening 13 can be widely opened and the operator can perform the various pieces of maintenance operation from the widely opened lower opening, so that workability of the maintenance operation can be improved.

Also, in the vehicle undercover 10 of this embodiment, the vehicle undercover 10 is formed of the synthetic resin and the fixed section 21 and the rotating section 22 are rotatably coupled to each other by the integral hinge 23 along the vehicle width direction. Therefore, the manufacturing cost can be reduced and a structure can be made simple, and also, by rotating the rotating section 22, which closes half way or more of the lower opening 13, the lower opening 13 can be easily opened.

Also, in the vehicle undercover 10 of this embodiment, the fixed section 21 is fixed to the front body 12 by the bolts 24 and the nuts 25 and the rotating section 22 is detachably attached to the front body 12 by the clips 26. Therefore, the fixed section 21 can be firmly fixed to the front body 12, and on the other hand, the rotating section 22 can be easily detachably attached to the front body 12, so that an effort of the operator at the time of the maintenance operation can be reduced.

Also, in the vehicle undercover 10 of this embodiment, the fixed section 21 is fixed to the front body 12 by the bolts 24 and the nuts 25, and the bolts 24 and the nuts 25 are provided side by side along the direction of the rotation axis center of the integral hinge 23. Therefore, reaction force caused when the rotating section 22 rotates can be efficiently received by the bolts 24 and the nuts 25, so that this can be prevented from becoming large.

Also, in the vehicle undercover 10 of this embodiment, the fixed section 21 is fixed to the front body 12 in the inclined state in which the side of the front portion of the vehicle 11 is inclined upward and the rotating section 22 is attached so as to close the lower opening 13 in the horizontal state. Therefore, a wide opening area of the lower opening 13 when the rotating section 22 rotates downward can be ensured and the integral hinge 23 can be easily set.

Also, the vehicle undercover 10 of this embodiment is provided with the reinforcing ribs 27 and 28 on the rotating section 22 along the vehicle longitudinal direction and along the vehicle width direction. Therefore, the reinforcing ribs 27 and 28 can be formed in succession to the rotating section 22, which composes a part of the vehicle undercover 10, and rigidity of the rotating section 22 can be ensured with a simple structure without making the reinforcing ribs 27 and 28 large.

Meanwhile, although the vehicle undercover 10 of the present invention is composed of the fixed section 21 and the rotating section 22 in the above-described embodiment, the rotating section can be composed of a plurality of members.

Also, although the fixed section 21 is arranged on the side of the front portion of the vehicle and the rotating section is arranged on a side of a rear portion of the vehicle, they may be inverted. Further, although the rotation axis center of the integral hinge is arranged along the width direction of the vehicle 11, this may be arranged along the longitudinal direction. Also, although the integral hinge is applied as a rotary coupling section of the fixed section 21 and the rotating section 22, a support axis or a rotation axis may be separately applied.

INDUSTRIAL APPLICABILITY

As described above, the vehicle undercover according to the present invention improves the aerodynamic performance of the vehicle and improves the workability of the maintenance operation by being composed of the fixed section fixed to the front body and the rotating section rotatably coupled to the fixed section so as to be able to open and close the lower opening, and can be usefully applied to any vehicle.

The invention claimed is:

1. A vehicle undercover provided on a lower opening of a front body of a vehicle, comprising:
   a fixed section fixed to the front body on a front edge side of the lower opening; and
   a rotating section, one end of which is rotatably coupled to the fixed section and another end of which vertically moves relative to the front body so as to be able to open and close a rear edge side of the lower opening,
   wherein the fixed section is fixed to the front body by a plurality of bolts and the plurality of bolts are provided side by side along a direction of a rotation axis center of the rotating section,
   wherein the fixed section is fixed to the front body in an inclined state in which a side of a front portion of a vehicle is inclined upward and the rotating section is configured to close the lower opening in a substantially horizontal state,
   wherein the fixed section and the rotating section are rotatably coupled to each other by an integral hinge along a vehicle width direction,
   wherein the vehicle undercover is formed of a synthetic resin, such that the fixed section, the rotating section, and the integral hinge are integrally formed of the synthetic resin,
   wherein the integral hinge is composed of a concave portion along a direction of a rotation axis between the fixed section and the rotating section, and
   wherein the fixed section is fixed to the front body by a bolt and the rotating section is detachably attached to the front body by a clip.

2. The vehicle undercover according to claim 1, wherein the fixed section closes a part of the lower opening, and the rotating section closes a remaining part of the lower opening, which is not closed by the fixed section.

3. The vehicle undercover according to claim 1, wherein the rotating section has a reinforcing rib along a vehicle longitudinal direction or along the vehicle width direction.

4. The vehicle undercover according to claim 1, wherein the concave portion of the integral hinge faces outward from the vehicle so as to allow the rotating section to pivot downward from the vehicle thereby collapsing an end of the rotating section toward an adjacent end of the fixed section.

5. The vehicle undercover according to claim 1, wherein the integral hinge extends laterally across an entirety of the vehicle undercover between the fixed section and the rotating section.

* * * * *